(12) United States Patent
Fukuyama et al.

(10) Patent No.: US 6,321,020 B1
(45) Date of Patent: Nov. 20, 2001

(54) GLASS SUBSTRATE AND TWO-STAGE MOLDING METHOD THEREFOR

(75) Inventors: Masashi Fukuyama, Komaki; Kazutoshi Tohyama, Nakatsugawa, both of (JP)

(73) Assignees: NGK Insulators, Ltd.; NGK Optoceramics, Ltd., both of Nagoya (JP)

( * ) Notice: Subject to any disclaimer, the term of this patent is extended or adjusted under 35 U.S.C. 154(b) by 0 days.

(21) Appl. No.: 09/277,491

(22) Filed: Mar. 26, 1999

(30) Foreign Application Priority Data

Mar. 31, 1998 (JP) .................................. 10-087744
Mar. 18, 1999 (JP) .................................. 11-074535

(51) Int. Cl.$^7$ ...................................... G02B 6/36
(52) U.S. Cl. ........................ 385/137; 65/102; 65/275; 385/83
(58) Field of Search ............................... 385/65, 78, 83, 385/136, 137; 65/102–107, 275, 285, 286, 305, 306, 319

(56) References Cited

U.S. PATENT DOCUMENTS 5,540,746 * 7/1996 Sasaki et al. ..................... 65/275
5,608,827 * 3/1997 Boscher et al. .................... 385/83 X
5,812,726 * 9/1998 Jinnai et al. ......................... 385/137
5,835,659 * 11/1998 Ota et al. ............................ 385/137
6,079,228 * 6/2000 Tomisaka ............................. 65/102

* cited by examiner

Primary Examiner—John D. Lee
(74) Attorney, Agent, or Firm—Burr & Brown

(57) ABSTRACT

There is provided a glass substrate having a V-groove portion for arranging an optical fiber core and a countersunk portion for containing an optical fiber coated portion, formed on the extension of the V-groove portion, on the surface thereof. The surface roughness of an inside side face of the countersunk portion is 1 μm or less in Rmax, or 0.2 μm or less in Ra at least at the connecting portion of the V-groove portion and the countersunk portion. The glass substrate is manufactured by a two-stage molding method in which a first molding step for forming a concave portion in the surface of a glass substrate molded body by grinding or pressing, and a second molding step for pressing the glass substrate molded body obtained by the first molding step from the top and bottom surfaces while reheating the molded body are performed.

6 Claims, 4 Drawing Sheets

FIG.1(a)    FIG.1(b)
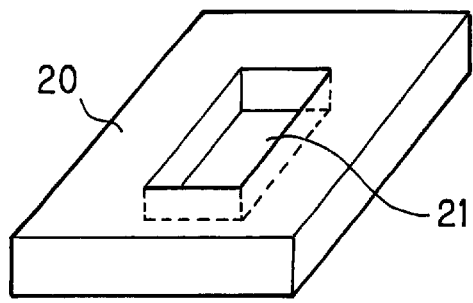
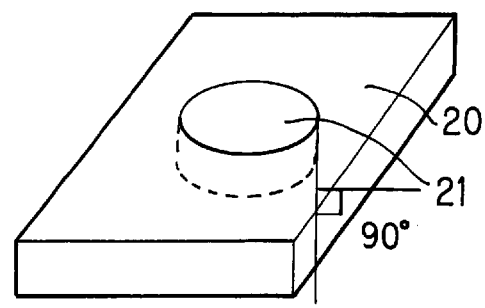
FIG.2
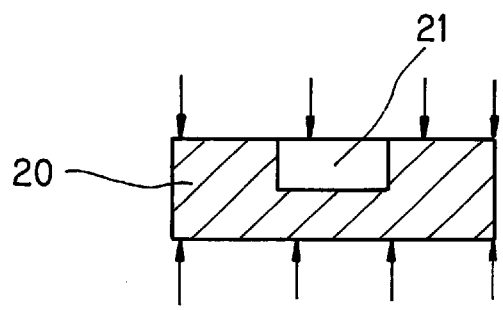
FIG.3
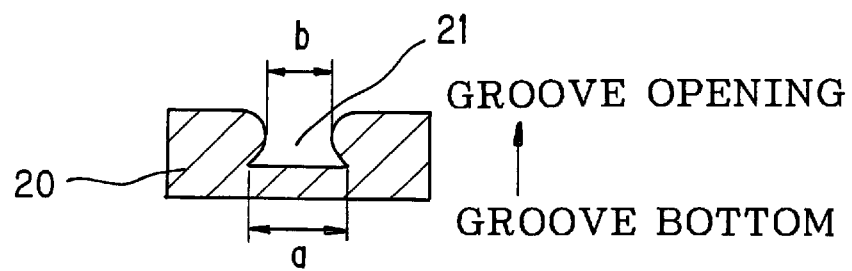

GLASS SUBSTRATE AND TWO-STAGE MOLDING METHOD THEREFOR

BACKGROUND OF THE INVENTION AND RELATED ART STATEMENT

The present invention relates to a glass substrate, which is formed with a concave portion, such as a V-groove portion and a countersunk portion, with a high surface accuracy on the surface of the glass substrate, and a two-stage forming method for the same.

As a fiber arraying part, there have been known a fiber array for the connection of a fiber to other optical parts and an MT connector for connecting fibers to each other. These optical parts for connection are manufactured by using a glass substrate having a fiber fixing groove. As one example, FIG. 5 shows the shape of the glass substrate having a groove in the surface thereof, what we call a V-grooved substrate.

As a method for molding a V-grooved glass substrate 3 having a V-groove 1 and a countersunk portion 2, which is a coated fiber storage portion, shown in FIG. 5, a reheat press is thought to be effective. The reheat press is a method in which molten glass is inserted into a mold, and a molded body roughly press molded into a desired shape or a body worked into a desired shape by grinding a glass material is press molded precisely by using a die while being reheated. Although a molded product having a V-groove only can be formed by even grinding, the countersunk shape as shown in FIG. 5 cannot be obtained by grinding. Therefore, the reheat press, which can precisely transfer the molding surface of die, is effective. Also, other than the reheat press, ultrasonic machining may be considered. However, this method has a problem in that chipping occurs on the machined surface when the roughness of machined surface has a P.V value not lower than 10 $\mu$m.

For the reheat press, since the accuracy of a die is reflected in the shape of molded surface, how the accuracy of a die surface is improved is an important problem. A die 4 for molding a V-grooved glass substrate shown in FIG. 5 is as shown in FIG. 6.

The shape of a convex portion 5 for the V-groove of this die 4 requires an accuracy within 1 $\mu$m on the surface thereof, so that it is difficult to achieve this accuracy unless grinding is performed. However, since in grinding, a grinding stone hits on the convex portion 5 for V-groove and a convex portion 6 for countersunk portion, it is actually difficult to manufacture this die by grinding.

A method in which a die is divided into several parts and these parts are assembled into one die, for example, a method in which a die part including the V-groove portion and a die part including a countersunk portion are manufactured separately and these two die parts are fixed with screws, has a high machining accuracy because each die part can be ground. However, as shown in FIG. 6, a gap of several micrometers is produced at a connecting portion 7. Therefore, if reheat press is performed by using this die 4, convex wall shaped burrs are produced on the molded product. If this burr is present between the V-groove and the countersunk portion, when a fiber core is placed, the fiber core is undesirably damaged.

Further, since misalignment easily occurs between the top surface of the V-groove portion and the top surface of the countersunk portion, the positional relationship between the fiber and the countersunk portion is shifted. Even if the gap is filled by welding of the connecting portion, the gap is reproduced by wear at the time of reheat press.

If the whole shape is manufactured by electrical discharge machining, the surface roughness of die becomes 10 $\mu$m and larger. Even if this surface is subjected to mirror polishing, the undulation of surface of about 5 $\mu$m is produced.

For the conventional optical fiber array, the boundary between the V-groove portion and the countersunk portion of the V-grooved glass substrate is as shown in FIG. 7. That is, since the countersunk portion 2 is formed by grinding, an edge is formed at a V-groove end portion 14, which is the boundary between the V-groove portion 1 and the countersunk portion 2. If the fiber core 15 hits on this edge, there is a possibility of the fiber core 15 being damaged and broken. Also, because of grinding, the surface roughness is also about 1 $\mu$m in Rmax, or about 0.2 $\mu$m or more in Ra.

On the other hand, formation of a concave portion in which the diameter of the bottom surface is larger than other diameters, for example, the diameter of the surface opening portion (hereinafter referred to as a dovetail-shaped concave portion for convenience) in the surface of the glass substrate is impossible to do by grinding, and even in press molding, mold release cannot be performed, so that molding is very difficult to do. As shown in FIG. 4, the dovetail-shaped concave portion 8 has an advantage in that if a resin 11 is poured into the dovetail-shaped concave portion 8 and is cured when two substrates 9 and 10 having such a concave portion are joined to each other, the resin 11 entering the bottom part of the concave portion is caught by a taper 12 (due a to so-called anchoring effect), so that separation is less liable to occur. For this reason, there is a demand for manufacturing a glass substrate having such a dovetail-shaped concave portion.

SUMMARY OF THE INVENTION

The present invention has been made to solve the above problems, and an object thereof is to provide a glass substrate which has a high surface accuracy of a concave portion such as a V-groove portion and a countersunk portion and is provided with a dovetail-shaped concave portion, which is difficult to manufacture by conventional molding methods, and a two-stage molding method for the glass substrate.

To achieve the above object, the present invention provides a glass substrate comprising a V-groove portion for arranging an optical fiber core and a countersunk portion for containing an optical fiber coated portion, formed on the extension of the V-groove portion, on the surface thereof, wherein the surface roughness of an inside side face of the countersunk portion is 1 $\mu$m or less in Rmax at least at the connecting portion of the V-groove portion and the countersunk portion.

Also, the present invention provides a glass substrate comprising a V-groove portion for arranging an optical fiber core and a countersunk portion for containing an optical fiber coated portion, formed on the extension of the V-groove portion, on the surface thereof, wherein the surface roughness of an inside side face of the countersunk portion is 0.2 $\mu$m or less in Ra at least at the connecting portion of the V-groove portion and the countersunk portion.

Further, the present invention provides a two-stage molding method for a glass substrate, comprising:
  a first molding step for forming a concave portion in the surface of a glass substrate molded body by grinding or pressing, and
  a second molding step for pressing the glass substrate molded body obtained by said first molding step from the top and bottom surfaces while reheating said molded body, whereby a glass substrate having a concave portion with a high surface accuracy is manufactured.

In the present invention, the concave portion such as the countersunk portion preferably has a shape having a portion where an opening portion diameter is smaller than the opening diameter at the bottom.

BRIEF DESCRIPTION OF THE DRAWINGS

FIG. 1(a) and FIG. 1(b) are perspective views showing an example of a glass substrate having a concave portion used in the present invention, in which FIG. 1(a) shows a case where the concave portion has a tapered side surface, and FIG. 1(b) shows a case where the concave portion has a side surface perpendicular to the bottom surface.

FIG. 2 is a schematic view showing a reheat press of a two-stage molding method in the present invention.

FIG. 3 is a schematic view showing an example of a glass substrate manufactured in accordance with the present invention.

DETAILED DESCRIPTION OF PREFERRED EMBODIMENT

An embodiment of the present invention will be described below with reference to the accompanying drawings.

FIGS. 1(a), 1(b), 2 and 3 show a flow of a two-stage molding method for a glass substrate in accordance with the present invention.

First, a concave portion is formed in the surface of a glass substrate by grinding or press molding. FIG. 1(a) shows a glass substrate molded body 20 formed with a concave portion 21 in the surface thereof. The side faces of the concave portion 21 have a taper spreading from the bottom of the concave portion 21 to the surface opening to facilitate mold release. In the case of press molding, the above-described tapered concave portion is usually formed to provide a mold releasing property.

FIG. 1(b) shows a glass substrate molded body 20 formed with a concave portion 21 in the surface thereof. The side face of the concave portion 21 is perpendicular to the bottom, not being tapered. The glass substrate molded part shown in FIG. 1(b) is manufactured by grinding. In the case of grinding, a concave portion having a vertical side face with respect to the bottom can be formed.

If a glass material having a lower coefficient of thermal expansion than the material of die is used, for example, Pyrex glass (trade name of Corning Inc. in U.S.A.) is used as the glass with the die being WC, a concave portion having a taper angle for mold release of 0 degree, that is, having a face perpendicular to the bottom can be formed as shown in FIG. 1(b).

Next, as shown in FIG. 2, a pressure is applied to the glass substrate molded body 20 having the concave portion in the surface thereof from the top and bottom surfaces while being reheated by using a press. Thereby, the shape of the concave portion 21 is changed as shown in FIG. 3.

Specifically, in the embodiment shown in FIG. 3, the shape of the concave portion 21 is such that the dimension (diameter) b decreases halfway toward the opening with respect to the bottom dimension (diameter) a of the concave portion 21 (a>b). Naturally, the shape of the concave portion 21 may be such that the condition of a>b is not met.

Also, the reheat press provides a side face portion of the concave portion 21 that has a natural curved face with very high surface accuracy and has a very small number of microcracks etc. on the surface, which cannot be obtained by press molding or grinding.

In the reheat press shown in FIG. 2, the pressure being applied and the heating temperature are appropriately selected according to the materials of die and glass and the intended side face shape of the concave portion 21.

Figure 4:
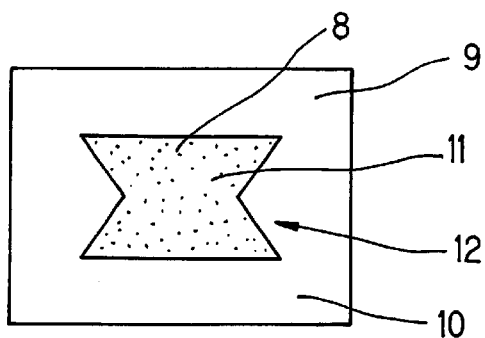
FIG. 4 is a sectional view showing an example of two substrates having a dovetail-shaped concave portion which are joined to each other.
Figure 5:
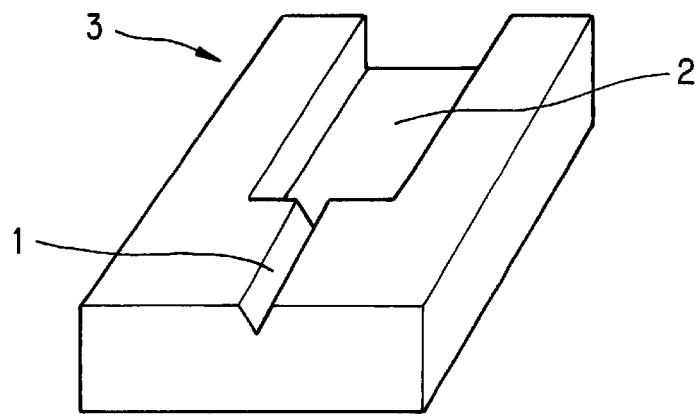
FIG. 5 is a perspective view showing an example of a glass substrate having a V-groove and a countersunk portion.
Figure 6:
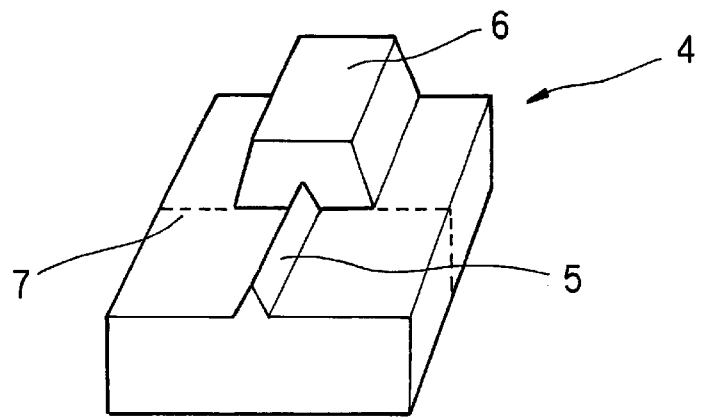
FIG. 6 is a perspective view showing a die for manufacturing the glass substrate shown in FIG. 5.
Figure 7:
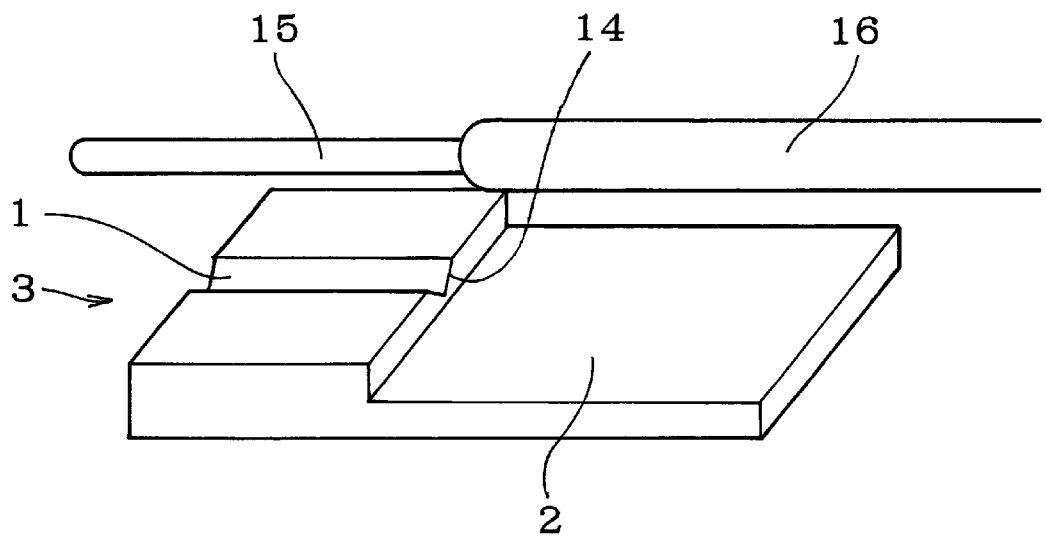
FIG. 7 is a perspective view showing another example of a conventional V-grooved glass substrate.
Figure 8:
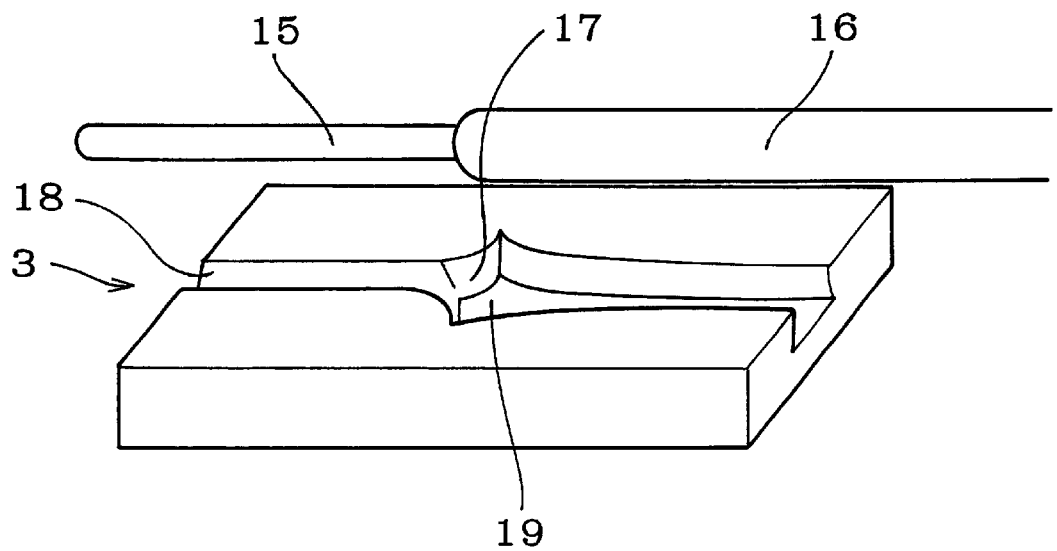
FIG. 8 is a perspective view showing another example of a glass substrate manufactured in accordance with the present invention.

FIG. 8 is a perspective view showing another example of a glass substrate having a V-groove portion and a countersunk portion in the surface thereof, which is obtained by a two-stage molding method in accordance with the present invention.

In FIG. 8, a glass substrate 3 has a V-groove portion 18 for arranging an optical fiber core 15 and a countersunk portion 19 for containing an optical fiber coated portion 16, which is formed on the extension of the V-groove portion 18, on the surface thereof.

For the glass substrate of the present invention, surface roughness of the inside side face of the countersunk portion 19 of 1 $\mu$m or less in surface roughness Rmax (maximum height), preferably in the range of 0.3 to 0.5 $\mu$m in Rmax, can be obtained at least at a connecting portion 17 of the V-groove portion 18 and the countersunk portion 19. Also, when the surface roughness is represented by Ra (roughness of arithmetic mean), the surface roughness of 0.2 $\mu$m or less, preferably in the range of 0.05 to 0.1 $\mu$m in Ra, can be obtained.

The roughness of arithmetic mean Ra is specified in Japanese Industrial Standard (JIS) as described below.

Ra is roughness expressed by a value obtained from Equation (1) in micrometer ($\mu$m) when a standard length is extracted from the roughness curve in the direction of a parallel line, the X axis is taken in the direction of the parallel line of the extracted portion, the Y axis is taken in the direction of longitudinal magnification, and the roughness curve is expressed by Y=f(X).

$$R_a = \frac{1}{\lambda} \int_0^\lambda |f(x)| \, dx \qquad \text{[Equation 1]}$$

Therefore, when the optical fiber core 15 is placed in the V-groove portion 18, the damage and breakage are less liable to occur. If this glass substrate is used, an optical fiber array having a fiber breakage preventive construction can be manufactured efficiently.

The above is a description of the embodiment of the present invention, but the present invention is not limited to this embodiment.

For example, in FIG. 1(a), the side face of the concave portion 21 has a tapered shape spreading from the bottom of the concave portion 21 to the surface opening thereof, and the taper angle (inclination angle from the vertical plane) is not restricted. However, in order for the shape of the concave portion 21 to meet the condition of a>b as shown in FIG. 3, the taper angle should preferably be in the range of 0 to 10°.

The following is a description of a specific example of the present invention.

EXAMPLE

Figure 9:
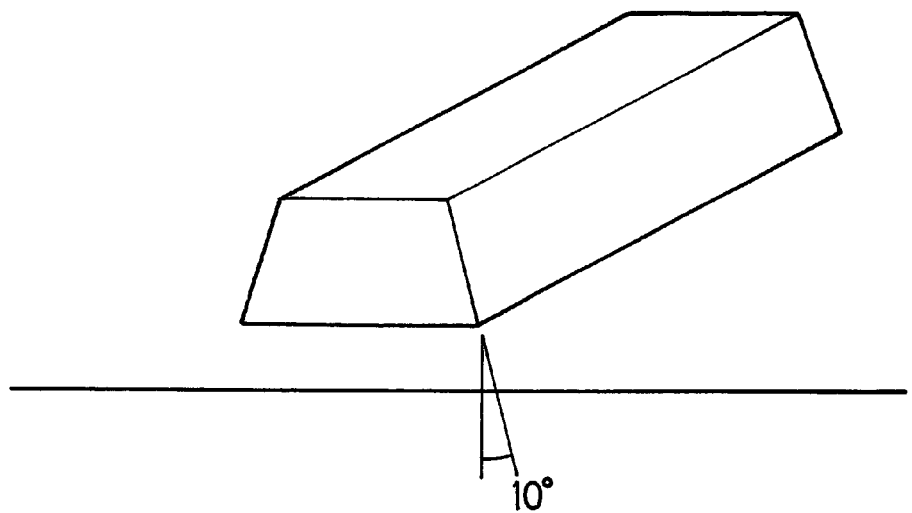
FIG. 9 is a perspective view showing an example of a die for a countersunk portion used in an embodiment.

A glass plate cut into about 50 mm (dia.)×2 mm (thickness) was reheat pressed by using a die for countersinking shown in FIG. 9 (a first molding step). The conditions for this step were a press pressure of 1100 kgf, a heating temperature of 575° C., and molding time of 5 minutes.

Figure 10:
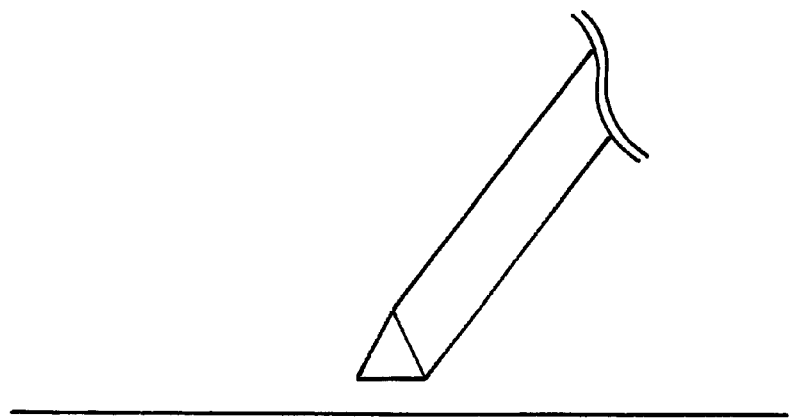
FIG. 10 is a perspective view showing an example of a die for a V-groove used in the embodiment.

The glass substrate, to which the countersunk shape had been transferred as described above, was reheat pressed again by using a die for V-groove shown in FIG. 10 (a second molding step). The conditions for this step were a press pressure of 500 kgf, a heating temperature of 575° C., and molding time of 1 minute in order to provide a natural curve of countersunk shape.

To align the shapes in the first and second molding steps, a guide groove was formed in the die for countersinking and the die for V-groove to align the positions.

By performing two-stage molding of the first and second molding steps as described above, a glass substrate having the shape shown in FIG. 8 was obtained.

The glass substrate having the shape shown in FIG. 8, thus obtained, had a high surface accuracy (including chipping) and surface roughness of 1 μm or less in Rmax, or μm or less in Ra. Moreover, the V-groove end portion 17 at the boundary between the V-groove portion 18 and the countersunk portion 19 had no edge and was formed into an R shape, so that when the optical fiber core 15 was placed, damage and breakage were less liable to occur.

As described above, according to the present invention, there can be manufactured a glass substrate that has a natural curved surface with a very high surface accuracy, which cannot be obtained by press molding or grinding, that is provided with a concave portion whose surface has a very small number of microcracks and other flaws, and in which an edge is absent at the V-groove end portion which is the boundary between the V-groove portion and the countersunk portion.

What is claimed is:

1. A glass substrate comprising: a V-groove portion for arranging an optical fiber core and a countersunk portion for containing an optical fiber coated portion, formed on an extension of said V-groove portion, on a surface thereof, wherein the surface roughness of an inside side face of said countersunk portion is 1 μm or less in Rmax at least at a connecting portion of said V-groove portion and said countersunk portion.

2. A glass substrate comprising a V-groove portion for arranging an optical fiber core and a countersunk portion for containing an optical fiber coated portion, formed on an extension of said V-groove portion, on a surface thereof, wherein the surface roughness of an inside side face of said countersunk portion is 0.2 μm or less in Ra at least at a connecting portion of said V-groove portion and said countersunk portion.

3. The glass substrate according to claim 1, wherein said countersunk portion has a portion where an opening portion diameter is smaller than an opening diameter at a bottom of said countersunk portion.

4. The glass substrate according to claim 2, wherein said countersunk portion has a portion where an opening portion diameter is smaller than an opening diameter at a bottom of said countersunk portion.

5. A two-stage molding method for a glass substrate, comprising:

a first molding step for forming a concave portion in a surface of a glass substrate molded body by grinding or pressing so that said glass substrate has a substantially flat surface in which said concave portion is formed, and a second molding step for pressing the glass substrate molded body obtained by said first molding step from top and bottom surfaces while reheating said molded body, whereby a glass substrate having a concave portion with a high surface accuracy is manufactured.

6. The two-stage molding method for a glass substrate according to claim 5, wherein said concave portion has a shape having a portion where an opening portion diameter is smaller than an opening diameter at a bottom of said concave portion.

* * * * *